(12) United States Patent
Shakirov et al.

(10) Patent No.: US 12,512,725 B2
(45) Date of Patent: Dec. 30, 2025

(54) DIRECT DRIVE MOTOR-BASED REDUCER FOR A BEAM PUMPING UNIT

(71) Applicant: Lex Submersible Pumps FZE Company, UAQ One (AE)

(72) Inventors: Anton Shakirov, Parekklisia (CY); Vitaly Koropetskiy, Tbilisi (GA); Yaroslav Alekseev, Paphos (CY); Anton Shkolnyi, Peyia (CY); Zelim Agnaev, Tbiliski (GA); Evgeny Nikonov, Batumi (GA)

(73) Assignee: Lex Submersible Pumps FZE Company, UAQ One (AE)

( * ) Notice: Subject to any disclaimer, the term of this patent is extended or adjusted under 35 U.S.C. 154(b) by 0 days.

(21) Appl. No.: 18/384,694

(22) Filed: Oct. 27, 2023

(65) Prior Publication Data

US 2024/0146149 A1  May 2, 2024

Related U.S. Application Data

(60) Provisional application No. 63/420,537, filed on Oct. 29, 2022.

(51) Int. Cl.
| | | |
|---|---|---|
| *E21B 43/12* | (2006.01) | |
| *H02K 1/278* | (2022.01) | |
| *H02K 7/116* | (2006.01) | |
| *H02K 21/14* | (2006.01) | |

(52) U.S. Cl.
CPC ............ *H02K 7/116* (2013.01); *H02K 1/278* (2013.01); *H02K 21/14* (2013.01); *H02K 2201/06* (2013.01)

(58) Field of Classification Search
CPC ........ H02K 7/116; H02K 1/278; H02K 21/14; H02K 2201/06
USPC ............................................................ 310/83
See application file for complete search history.

(56) References Cited

U.S. PATENT DOCUMENTS

| | | | | |
|---|---|---|---|---|
| 9,490,736 | B2 * | 11/2016 | Han | F03D 15/10 |
| 10,267,149 | B2 * | 4/2019 | Erlston | B60K 6/20 |
| 10,272,905 | B2 * | 4/2019 | Vyncke | B60W 10/06 |
| 10,428,629 | B2 * | 10/2019 | Liu | E21B 43/127 |
| 10,947,956 | B2 * | 3/2021 | Han | F03D 3/0454 |

(Continued)

FOREIGN PATENT DOCUMENTS

| | | | | |
|---|---|---|---|---|
| CN | 211579836 U | * | 9/2020 | |
| CN | 106030027 B | * | 12/2020 | ............ E21B 43/127 |

(Continued)

*Primary Examiner* — Alex W Mok
(74) *Attorney, Agent, or Firm* — G. Michael Roebuck, PC

(57) ABSTRACT

The engine with the direct drive of the gearbox of the sucker road pump includes a stator with a magnetic circuit, a winding and an input box, a rotor with magnetic circuit cores and permanent magnets, a front shield, and a back cover. The motor is not equipped with its own bearings. In this case, the stator is mounted directly on the gearbox instead of the input shaft bearing cover, and the rotor is mounted directly on the gearbox input shaft shank. The radial working gap between the stator and the motor's rotor is larger than the potential eccentricity of the gearbox input shaft relative to its housing. An axial bevel of permanent magnets and cores is made in the motor rotor. The motor stator winding, and the input box provide the possibility of connecting the phases in series or parallel.

3 Claims, 10 Drawing Sheets

(56) References Cited

U.S. PATENT DOCUMENTS

| | | | | |
|---|---|---|---|---|
| 2012/0094555 A1* | 4/2012 | Calverley | ................ | H02K 7/11 |
| | | | | 440/6 |
| 2015/0231957 A1* | 8/2015 | Lebeau | .................. | B60K 6/405 |
| | | | | 192/55.2 |
| 2016/0177770 A1* | 6/2016 | Adams | ..................... | H02K 1/17 |
| | | | | 290/46 |
| 2019/0234400 A1* | 8/2019 | Thomas | .................. | F04B 47/02 |
| 2020/0088156 A1* | 3/2020 | Han | ...................... | F03B 13/264 |

FOREIGN PATENT DOCUMENTS

| | | | | | | |
|---|---|---|---|---|---|---|
| CN | 112072883 | A | * | 12/2020 | | |
| CN | 112821713 | A | * | 5/2021 | | |
| CN | 112821714 | A | * | 5/2021 | | |
| EP | 3386080 | A1 | * | 10/2018 | ............. | B60K 17/12 |
| EP | 3099519 | B1 | * | 11/2019 | ............. | B60K 25/00 |
| EP | 3386080 | B1 | * | 11/2022 | ............. | B60K 17/12 |
| GB | 2586329 | A | * | 2/2021 | ............. | B60L 15/06 |

\* cited by examiner

Series connection of windings at low speed

Parallel connection of windings at high speed

Series connection of windings at low speed

DIRECT DRIVE MOTOR-BASED REDUCER FOR A BEAM PUMPING UNIT

RELATED APPLICATION

This patent application claims priority from U.S. provisional patent application Ser. No. 63/420,537 by Shakirov, et al., filed on Oct. 29, 2022, and entitled A DIRECT DRIVE MOTOR-BASED REDUCER FOR A BEAM PUMPING UNIT, which is hereby incorporated by reference in its entirety.

BACKGROUND OF THE INVENTION

Known pumping units for a sucker rod pump, typically contain a platform on which a rack has an installed balancer, upon one end of which is connected to a string of drive rods using a head and a flexible element, and the other end is connected through connecting rods to cranks mounted on the output shaft of the gearbox. An asynchronous electric motor drives the gearbox input shaft via a V-belt transmission. Power for the electric motor is provided by a variable speed drive. The disadvantages of the variable speed drive are, the discreteness of the change in the number of strokes due to the change of V-belt pulleys and the change of belts, the need to stop the pump drive to change the number of strokes, the difficulty of aligning the V-belt pulleys and adjust the correct tension of the belts, the need before each start-up to re-install and firmly fasten a protective fence, low reliability and durability of the V-belt transmission, the need for regular monitoring of the condition of the V-belt transmission, peak values of starting currents of an asynchronous electric motor, low efficiency and cos phi? and high acceleration rate of the asynchronous electric motor creates dynamic loads in the drive elements.

DESCRIPTION OF THE RELATED ART

Known adjustable electric pumping machines typically utilize a three-phase asynchronous motor with a squirrel-cage rotor and a frequency converter. The design of this drive inherits a V-belt transmission with its inherent disadvantages.

There are also known pumping units with direct drive gearbox without V-belt transmission. The engines are installed and fixed on the platform. These self-supported drive motors use couplings or junction boxes between the rotor and the gearbox input shaft to eliminate misalignment. The reliability and durability of mechanical misalignment compensators are relatively low.

Patents are known for pumping units having a direct drive motor, both sides of the shaft connected to cranks (U.S. Pat. No. 10,151,184 B2). In the absence of a gearbox, the torque of such an engine must exceed the torque of a traditional engine by a number of times equal to the product of the gear ratio of the gearbox and the gear ratio of the V-belt drive, and the rotational speed should correspond to the number of strokes of the pumping unit. At the same time, the power of the frequency converter of the variable speed drive must provide significant operating currents. The technical implementation of this known pumping unit is not economically feasible and has not been used in real oil production technology.

FIELD OF THE INVENTION

The present invention relates to the technique of oil production, and in particular to the drives of pumping units of sucker-rod pumps and can be used mainly in the oil-producing industries.

SUMMARY OF THE INVENTION

A particular illustrative embodiment of the invention is disclosed that substantially increases the reliability and durability of a sucker road pump, increases energy efficiency by saving electricity consumption and simplifies maintenance. A particular illustrative embodiment of the invention is disclosed that achieves this goal. The engine with the direct drive of the gearbox of the sucker road pump, a stator with a magnetic circuit, a winding and an input box, a rotor with magnetic circuit cores and permanent magnets, a front shield, and a back cover. The motor is not equipped with its own bearings. In this case, the stator is mounted directly on the gearbox instead of the input shaft bearing cover, and the rotor is mounted directly on the gearbox input shaft shank.

To eliminate the possibility of the rotating rotor touching the stationary stator during engine operation, a radial working gap between the stator and the engine rotor is larger than a potential eccentricity of the gearbox input shaft relative to its housing. The eccentricity is determined by the radial clearance of the gearbox bearings, the tolerances, and runouts of the gearbox parts mating with the bearings, and the wear of the rolling elements of the gearbox bearings during operation.

In a particular illustrative embodiment of the invention, an axial bevel of permanent magnets and cores is made in the motor rotor. The specified bevel in the magnetic system of the rotor ensures the smoothing of pulsations in the engine control system. It reduces the vibrations of the engine and pumping unit as a whole. The stator winding is made of six phases with output ends. The winding phase ends are connected to terminals in the input box. Conductive tires are installed on the terminals, and the placement of the tires in different positions ensures that the phases are connected in series or parallel into a three-phase star. The series connection of the phases ensures efficient operation of the motor with high torque at low speed and the parallel connection at high speed under limited supply voltage from the control system.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions. The drawings are drawn to scale.

Figure 1:
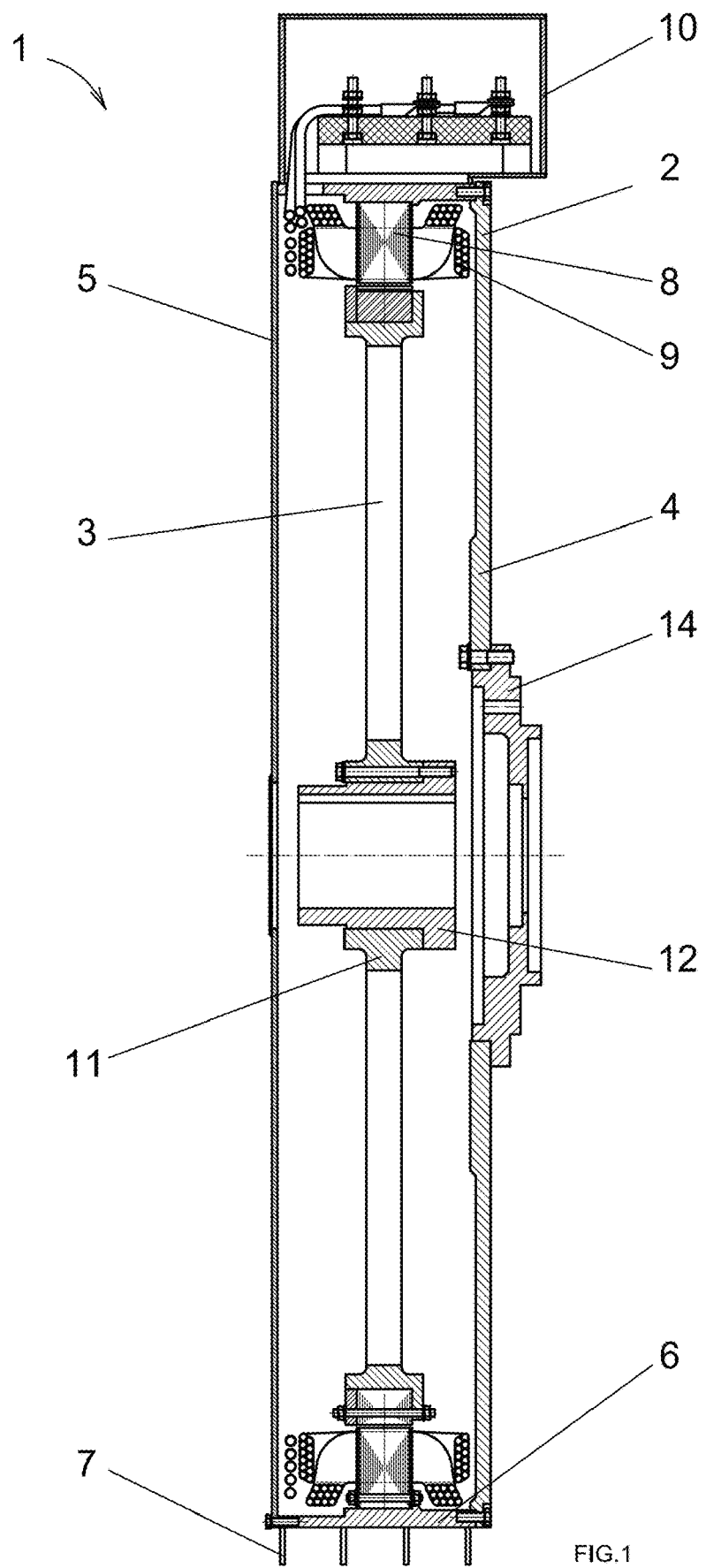
FIG. 1 is a schematic depiction of a cross sectional view of a particular illustrative embodiment of the invention depicting a structure of the engine.

DETAILED DESCRIPTION OF THE
PREFERRED EMBODIMENTS

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

The following reference numerals have been assigned to the specific elements of the disclosed particular illustrative embodiment of the invention:

1—Engine, 2—Engine stator, 3—Motor rotor, 4—Front shield, 5—Back cover, 6—Body, 7—External body ribs, 8—Stator magnetic circuit, 9—Stator winding, 10—Input box, 11—Rotor hub, 12—Mounting sleeve, 13—unassigned, 14—Adapter flange, 15—OEM gear bearing cover, 16—gearbox input shaft, 17—Reducer, 18—Rotor cores, 19—Permanent magnets, 20—Electrical steel sheet, 21—Electrical steel sheet, 22—End ring, 23—End protrusion of the hub, 24—Threaded studs, 25—Rotor wedges, 26—Terminals, 27—Tires, 28—Variable speed drive and 29—Cable.

A clear and complete description of the technical schemes of the Invention embodiments will be given in combination with the drawings of the Invention embodiments as follows. The embodiments further clarify the presently claimed subject matter and shall not be construed to limit the scope of the present claimed subject matter.

Figure 2:
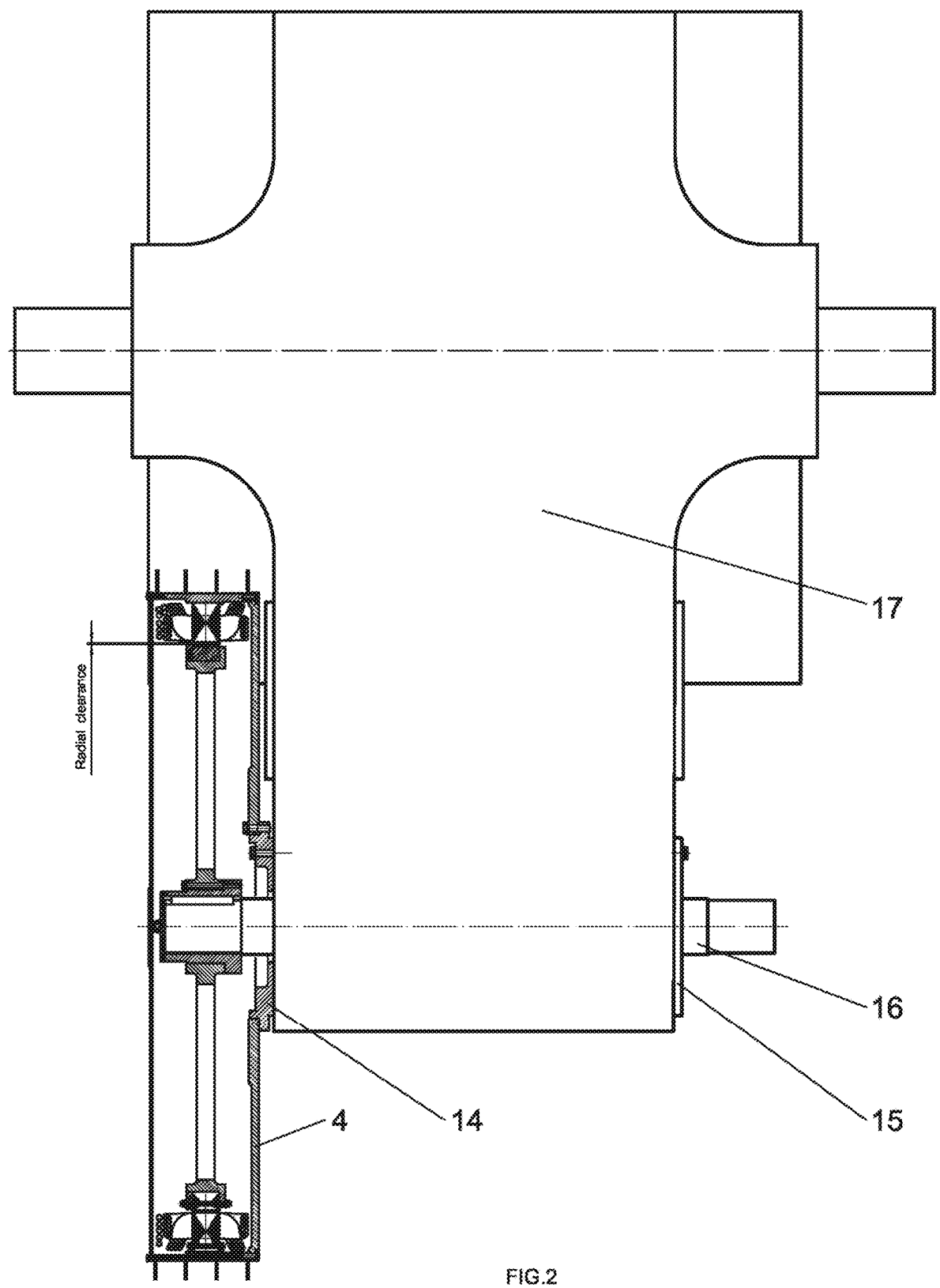
FIG. 2 is a schematic depiction of a cross sectional view of a particular illustrative embodiment of the invention depicting an installation scheme of the engine on the gearbox of the sucker road pump.

FIG. 1 and FIG. 2 illustrate the arrangement of engine 1 in a particular illustrative embodiment of the invention. Engine 1 with direct drive gear of the sucker road pump includes stator 2, rotor 3, front shield 4, and rear cover 5. Stator 2 is configured as a body 6 having a cylindrical shape with external ribs 7. Inside body 6 is a magnetic circuit 8, assembled from sheets of electrical steel. A winding 9 is placed in the grooves of the magnetic circuit 8. An input box 10 is placed in the upper part of the stator.

The rotor 3 of engine 1 consists of a hub 11 made of non-magnetic material, a mounting sleeve 12, and a magnetic system. The front shield 4 contains an adapter flange 14. The configuration of the adapter flange 14 repeats the configuration and fastening elements of the standard bearing cover 15 of the input shaft 16 of the gearbox 17. In a particular illustrative embodiment of the invention, an adapter flange 14 contains a gearbox bearing gland seal when used in the standard gearbox cover. The adapter flange 14 contains structural elements for replenishing the lubrication of the gearbox bearing when they are used in the standard gearbox cover.

A screw fastening of the adapter flange 14 to the front shield 4 provides the possibility of changing the adapter flanges, thereby ensuring the versatility of motor 1 in terms of use with various brands and sizes of gearboxes. The back cover 5 closes the internal cavity of engine 1.

Figure 3:
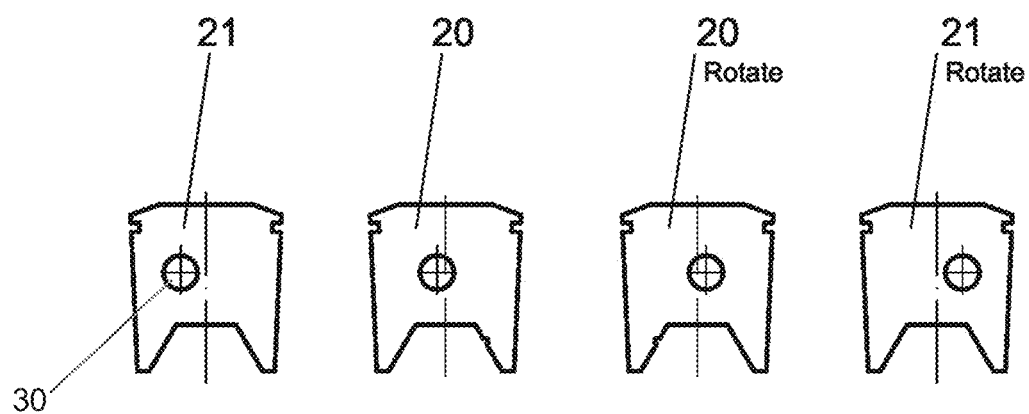
FIG. 3 is a schematic depiction of a cross sectional view of a particular illustrative embodiment of the invention depicting a set of rotor core sheets.
Figure 4:
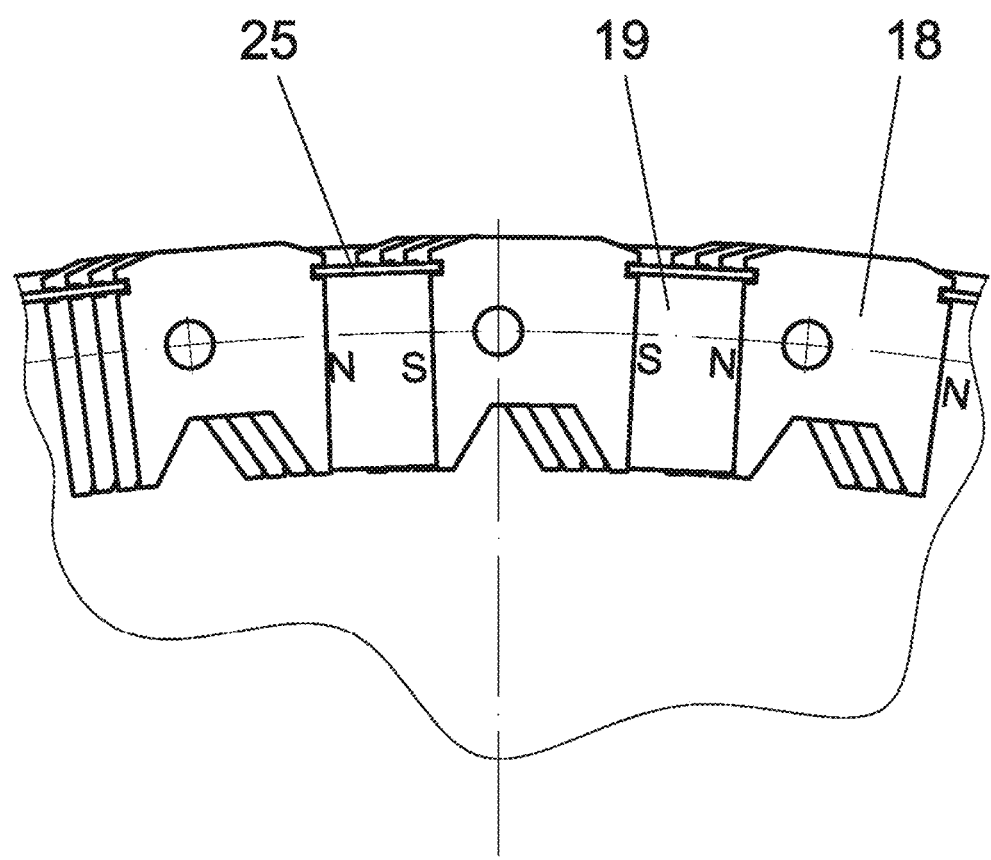
FIG. 4 is a schematic depiction of a cross sectional view of a particular illustrative embodiment of the invention depicting a bevel of the rotor magnetic system, side view.
Figure 5:
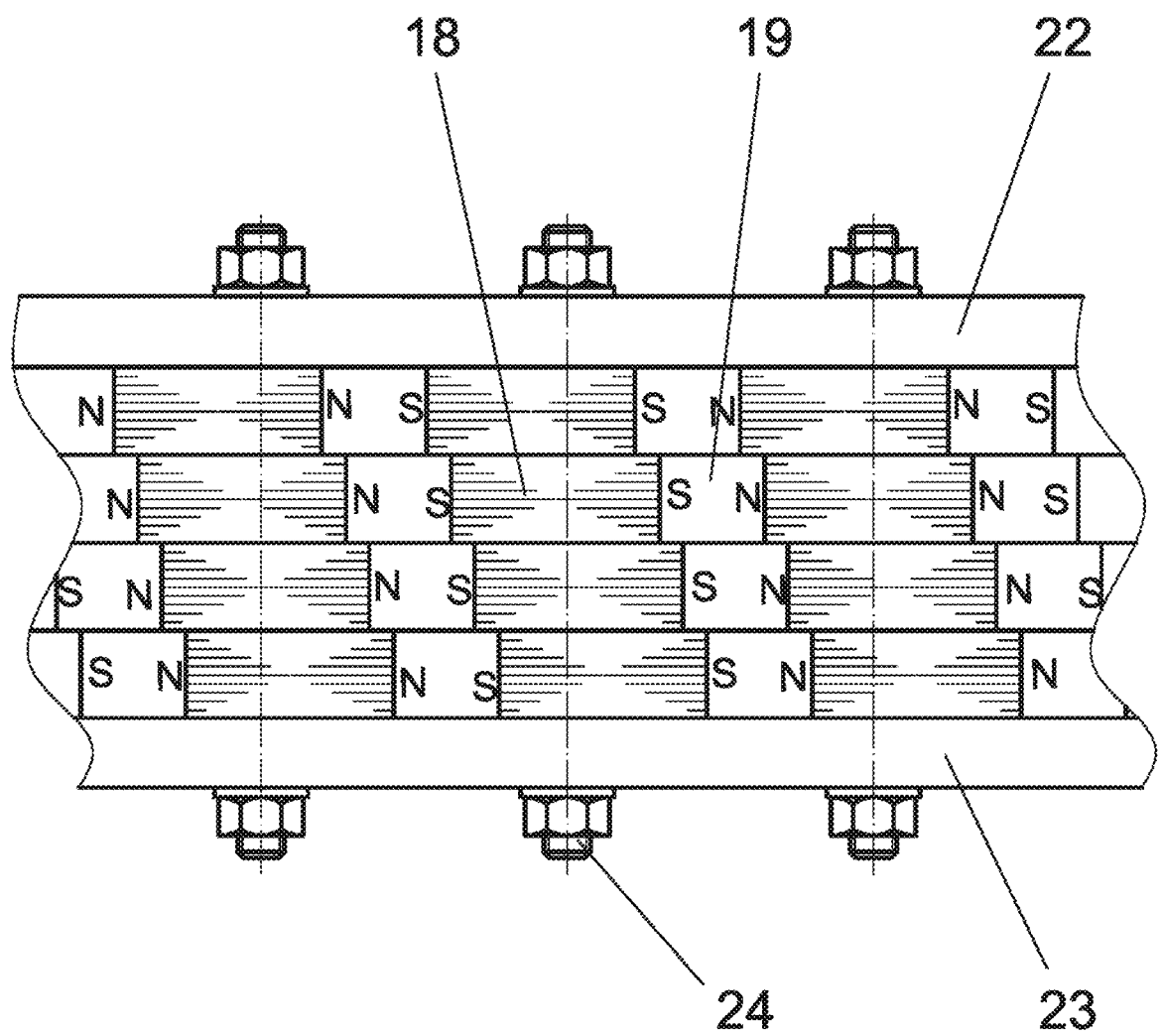
FIG. 5 is a schematic depiction of a cross sectional view of a particular illustrative embodiment of the invention depicting a bevel of the rotor magnetic system, viewed from above.
Figure 6:
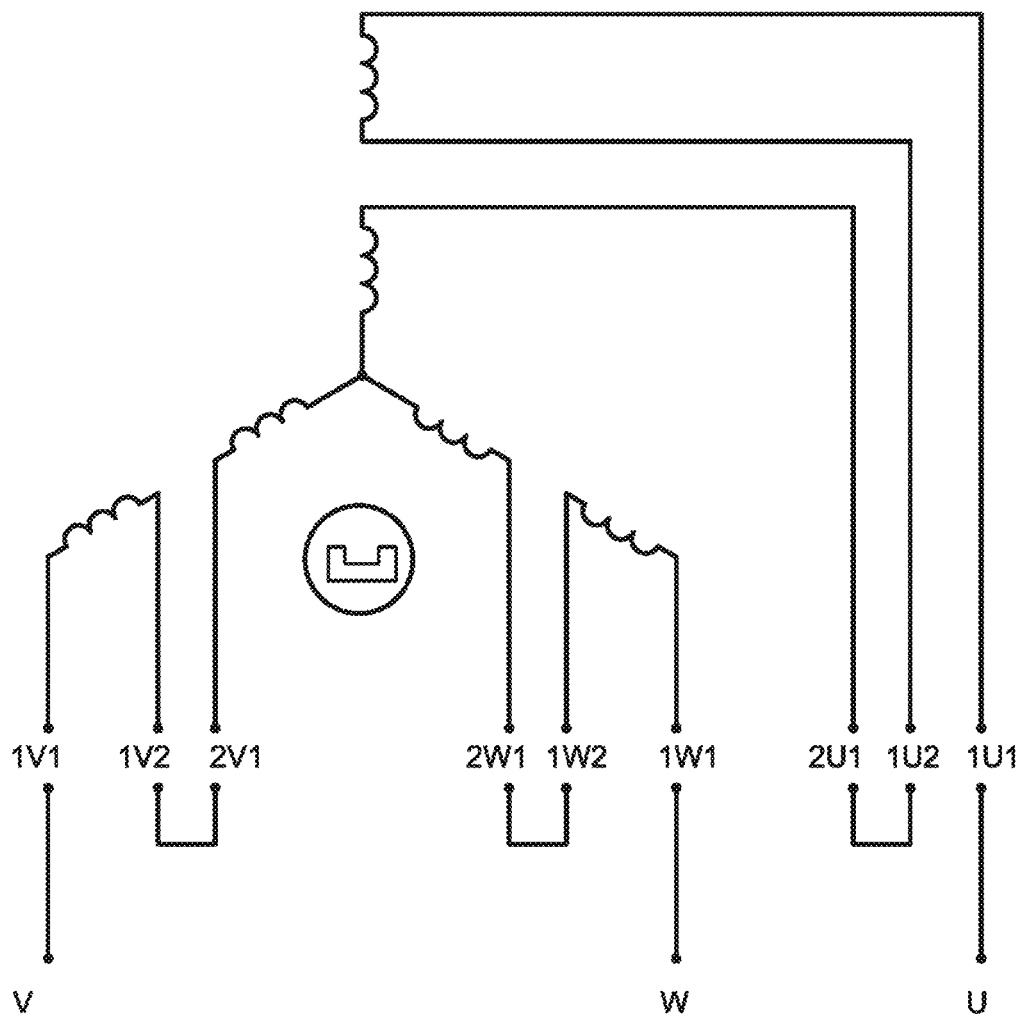
FIG. 6 is a schematic depiction of a particular illustrative embodiment of the invention depicting an electrical circuit diagram of a motor with a series connection of windings.
Figure 7:
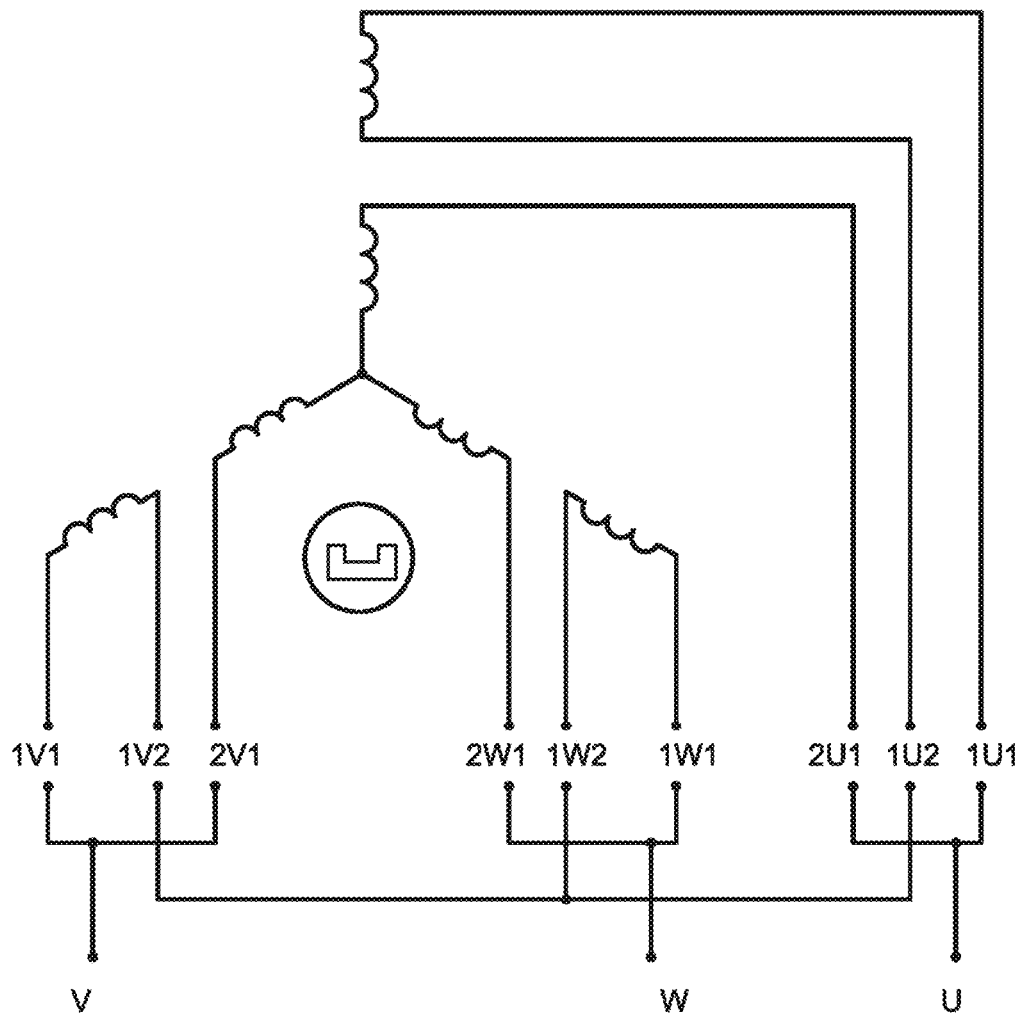
FIG. 7 is a schematic depiction of particular illustrative embodiment of the invention depicting a schematic diagram of a motor with parallel connection of windings.
Figure 8:
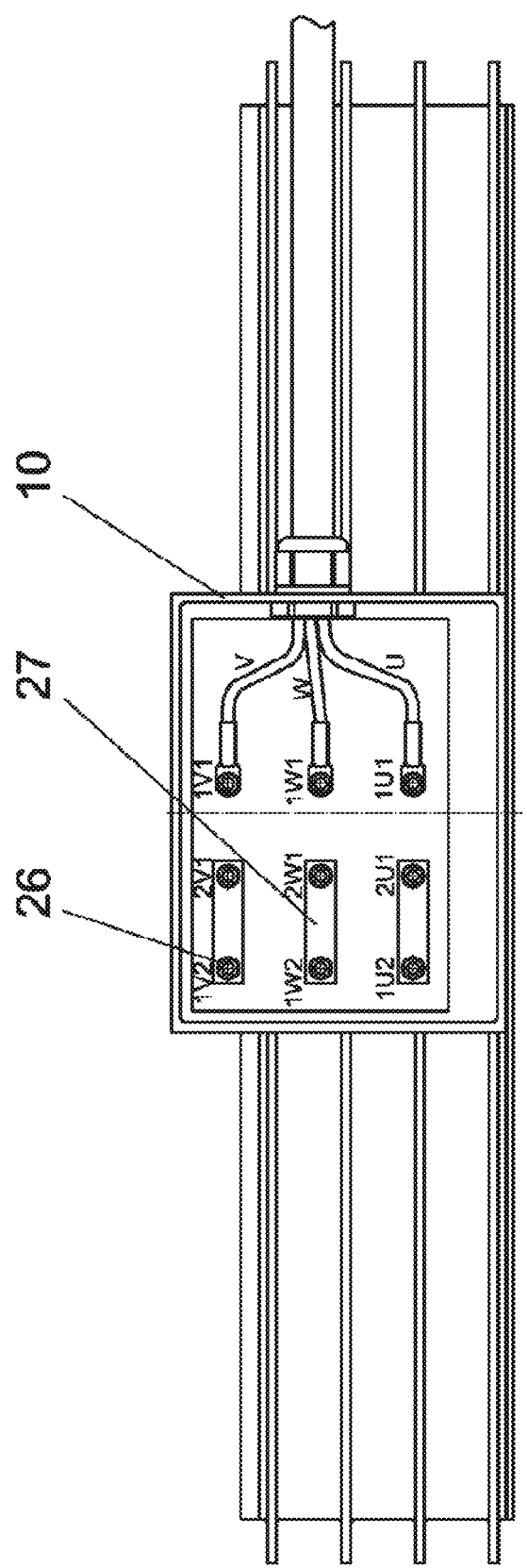
FIG. 8 is a schematic depiction of a cross sectional view of a particular illustrative embodiment of the invention depicting an installation of current-carrying tires with a serial connection of the windings.
Figure 9:
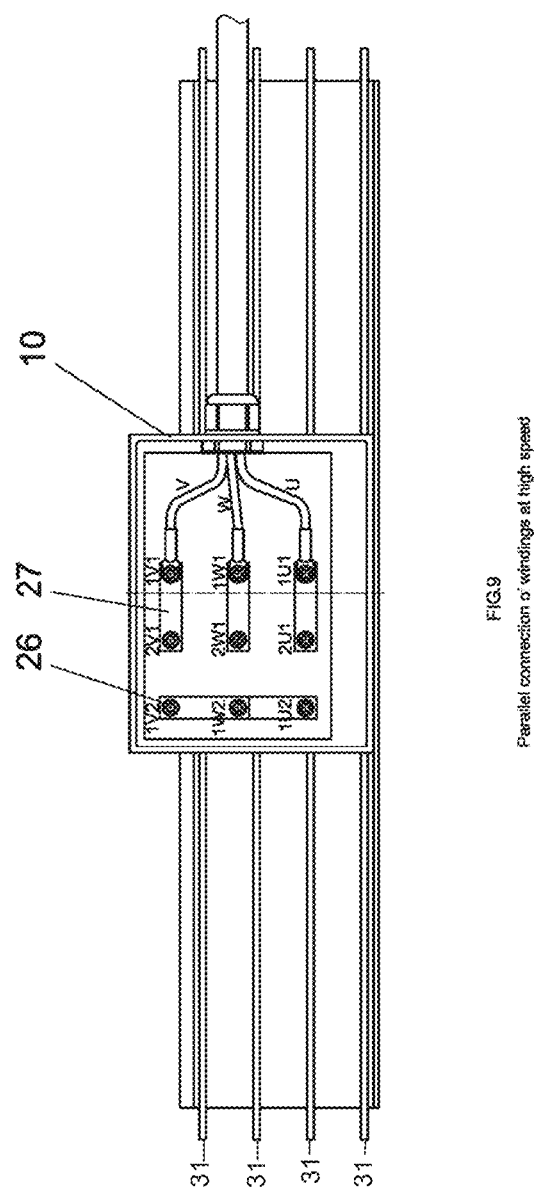
FIG. 9 is a schematic depiction of a cross sectional view of a particular illustrative embodiment of the invention depicting an installation of current-carrying tires with a parallel windings connection.

FIGS. 3, 4, and 5 illustrate the magnetic system of rotor 3. The magnetic system consists of cores of the magnetic circuit 18 and permanent magnets 19 of a prismatic shape. The cores of magnetic circuit 18 are made of sheets 20 and 21 of electrical steel. The cores 18 are fixed between the end ring 22 and the end ledge 23 of the hub with axial threaded studs 24 or rivets. Permanent magnets 19 are installed between the cores of the magnetic circuit 18 and fixed with wedges 25 made of non-magnetic material. Sheets 20 and 21 are made with mounting holes 30 for installing axial pins 24, and the holes are offset relative to the axis of symmetry. Thus, to provide a four-stage bevel of the permanent magnets and rotor cores in the axial direction, as shown in FIG. 5, it is enough to make two versions of sheets 20 and 21. The number of bevel steps can be any and is selected for reasons of manufacturability.

FIGS. 6, 7, 8, and 9 illustrate a device that extends the speed range of engine 1. The winding 9 of stator 2 is made of six phases distributed along the perimeter of the magnetic circuit 8. The ends of the three phases are connected in a "star" with an isolated zero point. The beginnings of these phases are brought out to terminals 26 in input box 10. The beginnings and ends of the other three phases are brought out to terminals 26 in input box 10. Conductive tires 27 are installed on terminals 26 and are galvanically connected to the phase leads. The placement of tires 27 in different positions (FIG. 8 and FIG. 9) provides the connection between the phases in series or parallel in a three-phase star. The series connection of the phases ensures efficient operation of the motor with high torque at low speed and the parallel connection at high speed under conditions of limited supply voltage from the control system.

Figure 10:
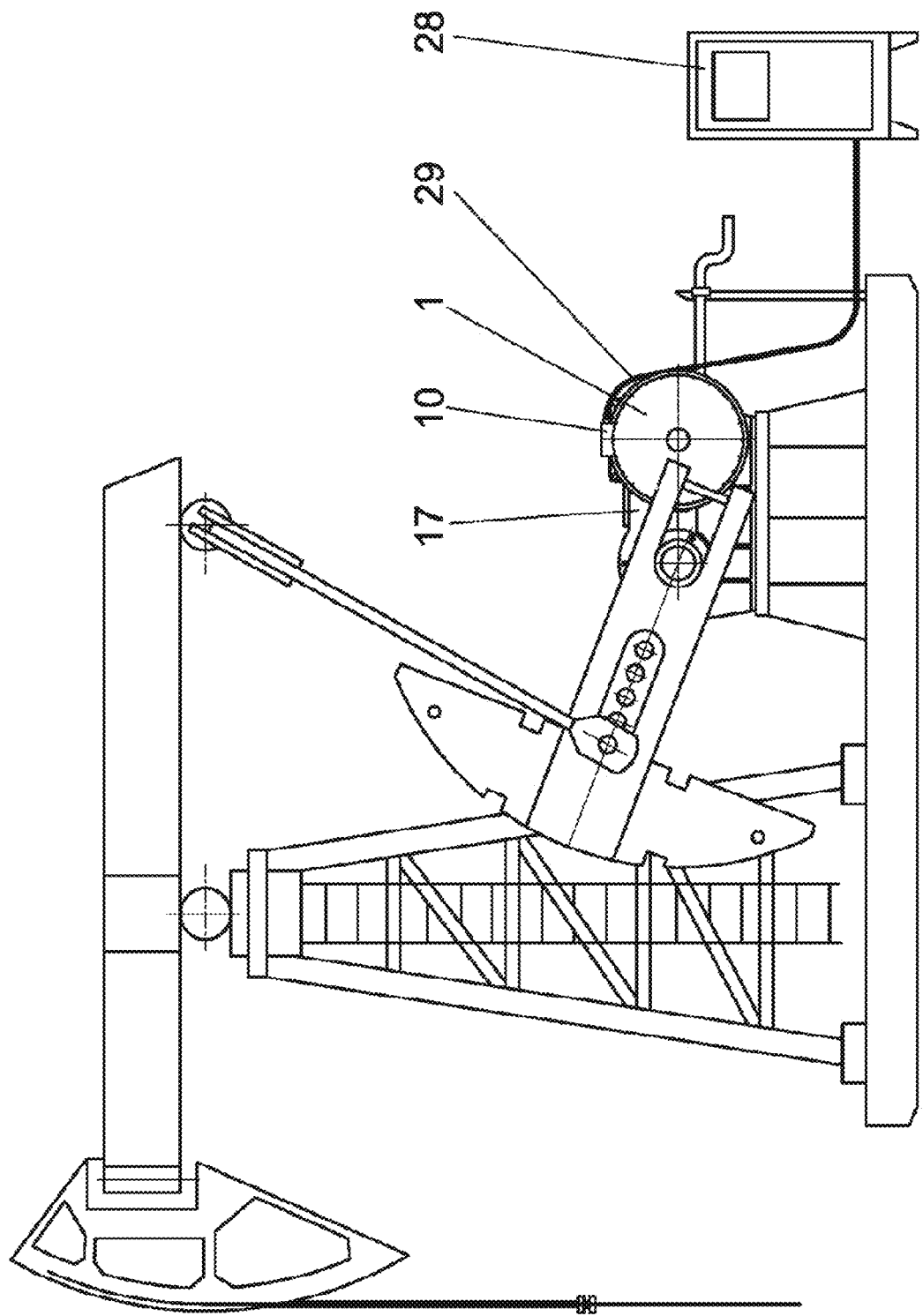
FIG. 10 is a schematic depiction of a cross side view of a particular illustrative embodiment of the invention depicting a sucker road pump with a direct drive gear motor installed.

FIG. 10 illustrates the general layout of the sucker road pump with a balancing mechanism and variable speed drive 28. The variable speed drive 28 supplies power with the frequencies and amplitudes required by the well operation mode, ensuring a smooth start and the number of strokes per minute necessary for the operation of the pumping unit via a three-phase cable 29, connected to the input box 10 of the engine 1. Smooth regulation of the number of strokes and optimization of formation fluid extraction modes are provided by variable speed drive 28 due to a special algorithm for switching the phases of the engine 1 power supply.

A particular illustrative embodiment of the invention is disclosed having an engine with the direct drive of the gearbox of the sucker road pump and variable speed drive, providing smooth regulation of the number of strokes, which is a synchronous AC electric machine without its own bearings, consisting of a stator with a magnetic circuit, a winding and an input box, a rotor with magnetic cores and permanent magnets, front shield and rear cover, characterized in that the motor stator assembly with the front guard is installed directly on the gearbox instead of the gearbox input shaft bearing cover, the motor rotor is installed directly on the gearbox input shaft shank. The radial clearance between the stator and the rotor exceeds the potential eccentricity of the input shaft relative to the gearbox housing.

Another particular illustrative embodiment of the invention is disclosed having Motor with direct drive for the sucker road pump, according to claim 1, is characterized in that the stator winding is made of six phases with output ends, and the rearrangement of the busbars 31 in the input box allows you to connect the phases in series or parallel into a three-phase star.

Another particular illustrative embodiment of the invention is disclosed having Motor with direct drive for the sucker road pump, according to claim 1, is characterized in that the stator winding is made of six phases with output ends, and the rearrangement of the busbars in the input box allows you to connect the phases in series or parallel into a three-phase star.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom.

The invention claimed is:

1. A direct drive motor for a sucker road pump, comprising:
   a variable speed direct drive motor;
   a gearbox of a sucker road pump and variable speed drive, providing smooth regulation of a number of strokes, which is a synchronous alternating current electric machine without its own bearings, a stator attached to the gearbox;
   a stator on the direct drive motor;
   a magnetic circuit on the stator;
   a stator winding on the stator;
   an input box on the direct drive motor;
   a rotor on the direct drive motor;
   rotor cores on the rotor;
   permanent magnets on the rotor; and
   a front shield and rear cover, characterized in that a motor stator assembly with a front guard is installed directly on the gearbox instead of a gearbox bearing cover, the motor rotor is installed directly on a gearbox input shaft, wherein a radial clearance between the stator and the rotor exceeds a potential eccentricity of the input shaft relative to the gearbox.

2. The direct drive motor for a sucker road pump claim 1, wherein the rotor cores of the rotor magnetic circuit are made with an offset of a mounting hole relative to an axis to ensure that the permanent magnets and rotor cores are beveled in an axial direction.

3. The direct drive motor for a sucker road pump of claim 1, wherein the stator winding is made of six phases with output ends, and a rearrangement of a plurality of busbars in the input box allows connection of the phases in series or parallel into a three-phase star.

* * * * *